United States Patent
Kim et al.

(10) Patent No.: US 9,993,103 B2
(45) Date of Patent: Jun. 12, 2018

(54) WHOLE SOYBEAN CURD PRODUCTION SYSTEM HAVING HEATING DEVICE AND COOLING DEVICE, AND METHOD FOR PRODUCING WHOLE SOYBEAN CURD

(71) Applicants: Bok-Ja Kim, Incheon (KR); Ik Jae Lee, Bucheon-si (KR)

(72) Inventors: Bok-Ja Kim, Incheon (KR); Ik Jae Lee, Bucheon-si (KR)

(*) Notice: Subject to any disclaimer, the term of this patent is extended or adjusted under 35 U.S.C. 154(b) by 41 days.

(21) Appl. No.: 14/770,839

(22) PCT Filed: Feb. 28, 2014

(86) PCT No.: PCT/KR2014/001688
§ 371 (c)(1),
(2) Date: Aug. 27, 2015

(87) PCT Pub. No.: WO2014/133363
PCT Pub. Date: Sep. 4, 2014

(65) Prior Publication Data
US 2016/0007788 A1    Jan. 14, 2016

(30) Foreign Application Priority Data

Feb. 28, 2013  (KR) .................. 10-2013-0021945

(51) Int. Cl.
*A47J 37/08*  (2006.01)
*A47J 27/08*  (2006.01)
(Continued)

(52) U.S. Cl.
CPC ........... *A47J 27/0817* (2013.01); *A23C 20/00* (2013.01); *A23C 20/025* (2013.01); *A23L 11/09* (2016.08);
(Continued)

(58) Field of Classification Search
CPC .. A47J 27/0817; A47J 27/0802; A47J 27/086; A47J 27/04; A47J 2027/043
(Continued)

(56) References Cited

U.S. PATENT DOCUMENTS

4,906,337 A * 3/1990 Palmer ...................... C02F 1/16
126/362.1
5,207,148 A * 5/1993 Anderson ............... A47J 31/36
137/893
(Continued)

FOREIGN PATENT DOCUMENTS

CN    1051114 A    5/1991
CN    1433705 A    8/2003
(Continued)

OTHER PUBLICATIONS

International Search Report dated Jun. 9, 2014 From the Korean Intellectual Property Office Re. Application No. PCT/KR2014/001688 and Its Translation Into English.

*Primary Examiner* — Thien S Tran
(74) *Attorney, Agent, or Firm* — Maschoff Brennan

(57) ABSTRACT

The present invention relates to a whole soybean curd production system having a heating device and a cooling device, and a method for producing whole soybean curd and, more specifically, to a whole soybean curd production system and a method for producing whole soybean curd, the whole soybean curd production system comprising: a heating device having a steam boiler formed to be opened and closed so as to enable inside thereof to be cleaned; and a cooling device having a cooling means formed from a Peltier element.

6 Claims, 12 Drawing Sheets

(51) Int. Cl.
  *A23C 20/00* (2006.01)
  *A23C 20/02* (2006.01)
  *A47J 27/04* (2006.01)
  *A47J 27/086* (2006.01)
  *A23L 11/00* (2016.01)
(52) U.S. Cl.
  CPC ........... *A47J 27/04* (2013.01); *A47J 27/0802* (2013.01); *A47J 27/086* (2013.01); *A47J 2027/043* (2013.01)
(58) Field of Classification Search
  USPC .......... 99/275, 278, 281, 453, 454; 426/231, 426/474, 606, 634
  See application file for complete search history.

(56) References Cited

U.S. PATENT DOCUMENTS

2002/0043070 A1* 4/2002 Bedard ............... B67D 1/0043
                                                        62/68
2005/0249852 A1* 11/2005 Smith ................. B67D 1/0864
                                                        426/524
2010/0255588 A1* 10/2010 Schenker ............... G01K 17/04
                                                        436/43

FOREIGN PATENT DOCUMENTS

| | | | |
|---|---|---|---|
| CN | 201332962 Y | | 10/2009 |
| CN | 102448325 A | | 5/2012 |
| JP | 2001348097 A | * | 12/2001 |
| KR | 20-0160852 | | 11/1999 |
| KR | 20-2000-0000583 | | 1/2000 |
| KR | 102007009442 A | * | 9/2007 |
| KR | 10-0787490 | | 12/2007 |
| KR | 10-0859703 | | 9/2008 |
| KR | 10-2011-0117942 | | 10/2011 |
| KR | 101162297 | * | 4/2012 |
| KR | 10-1162297 | | 7/2012 |
| WO | WO 2014/133363 | | 9/2014 |

* cited by examiner

WHOLE SOYBEAN CURD PRODUCTION SYSTEM HAVING HEATING DEVICE AND COOLING DEVICE, AND METHOD FOR PRODUCING WHOLE SOYBEAN CURD

RELATED APPLICATIONS

This application is a National Phase of PCT Patent Application No. PCT/KR2014/001688 having International filing date of Feb. 28, 2014, which claims the benefit of priority of Korean Patent Application No. 10-2013-0021945 filed on Feb. 28, 2013. The contents of the above applications are all incorporated by reference as if fully set forth herein in their entirety.

FIELD AND BACKGROUND OF THE INVENTION

The present invention relates to a whole soybean curd production system having a heating device and a cooling device, and a method for producing a whole soybean curd, and in particular to a whole soybean production system having a heating device formed of a steam boiler configured in an openable and closable type for the sake of an inner cleaning and a cooling device formed of a Peltier element and a method for producing a whole soybean curd.

In general, a conventional soybean curd is manufactured in such a way that soybeans are immersed in water to swell, and the swollen soybeans are crushed, thus manufacturing a soymilk (soybean juice), and an unpressed soybean curd is manufactured by inputting a coagulant into the soymilk, and a soybean curd is consequently manufactured by pressing the unpressed soybean curd. The thusly manufactured soybean curd is disadvantageous in the way that water wherein an organic acid, sugar and water soluble proteins are melted during a water immersion of the soybean are wasted, and a bean curd dreg is produced as by-product.

The bean curd dreg contains a lot of nutrition, for example, sugar, dietary fiber, protein, oligosaccharides, isoflavone, etc. If such nutrition is not appropriately used, there will be a lot of loss in terms of economical and nutrition nutritional aspects.

Meanwhile, a lot of water is necessary to manufacture a soybean curd using soybean. To this end, there may be a problem in treating the water used.

In order to resolve the above mentioned problem, a finely crushed flour of soybean is melted to manufacture a soymilk, and the soymilk is heated and boiled and is coagulated by adding a coagulant, thus manufacturing a whole soybean curd. In this case, there may be some advantages in the way that when the whole soybean curd is manufactured, a swelling time of soybean can be decreased, and materials can be saved, and the production of a lot of waste water which may be produced during a part of the process can be prevented.

The above mentioned method for manufacturing a whole soybean curd is provided to manufacture a soybean curd gel in a packed container in such a way to manufacture a soymilk using a fine soybean flour and perform a heat treatment and add a coagulant. As compared to the conventional method for manufacturing a soybean curd, a processing procedure is simpler, and the method is more economical. It is possible to manufacture various kinds of whole soybean curds to which various sub-ingredients are added.

The apparatus for manufacturing such a whole soybean curd is described in the Korean patent registration number 10-0859703 (apparatus for manufacturing whole soybean curd). The apparatus for manufacturing a whole soybean curd disclosed in the Korean patent registration number 10-0859703 includes a box-shaped body 10 which equips with a water softening unit and a cooling unit and is configured to indirectly cool a cooling water and circulates it; a plurality of agitators which are disposed exposed to the top of the body and are connected to the water softening unit through a connection pipe and perform a continuous process; a heating unit which is driven by an electricity in the inside of the body and is connected to the agitators and equips with a zigzag flow path on one surface or both surfaces; a coagulator which is formed of a dual structure container which is installed exposed to the top of the body and is connected to the heating unit and serves to circulate a cooling water into the space of a wall body, and an agitation motor installed on top of the double structure container; and a controller which is provided to perform a process in the set mode in such a way to intermittingly drive the pump connected between the agitators, the heating unit and the coagulator.

Similar devices have been developed and described in the Korean patent publication number 10-2011-0117942 and the Korean patent registration number 10-858026.

In addition, the conventional apparatus for manufacturing a whole soybean curd of the Korean patent registration number 10-0787490 (title: method and apparatus for manufacturing a whole soybean curd) includes an agitating tank, a steam pressure pot, a deaerator tank, a low temperature storing tank, a filling and packing unit, a first heat boiling tank, a second heat boiling tank, a first cooling tank, a second cooling tank, a freezer, a boiler, etc.

The conventional agitation tank disclosed in the Korean patent registration number 10-0787490 is directed to a water tank wherein soybean which is a principle ingredient of a soybean curd and water are mixed and agitated and operates at a low speed or a high speed. The soymilk mixed in the agitation tank flows into the steam pressure pot and is boiled in the steam pressure pot at 100~110° C. and is sterilized.

Any impurities contained in the soymilk sterilized in the steam pressure pot are filtered while it passes through a filtering mesh, and a soybean smell can be removed by a fan while it passes through the deaerator tank. The soy milk which has passed through the deaerator tank is cooled in the low temperature storing tank. At this time, the soymilk is cooled to below 10° C. while it is continuously agitated at a low speed. The soymilk mixed with a coagulant is moved to the filling and packing device and is filled and packed into a container for 3 or 5 times.

When the filling and packing procedure is finished, the soymilk is moved to a heat boiling tank for heating. The heat boiling tank is formed of a first heat boiling tank and a second heat boiling tank. A first heat boiling process is performed at around 50~60° C. for 30~40 minutes in the first heat boiling tank, and a second heat boiling process is performed at around 85° C. for 30~40 minutes in the second heat boiling tank. In the first heat boiling tank, a heat boiling process is performed at an appropriate temperature for an enzyme reaction. In the second heat boiling tank, a heat boiling process is performed for a reaction wherein calcium chloride or magnesium chloride coagulates soymilk.

The above soybean curd is moved to the cooling tank and is cooled to a low temperature. The cooling tank is formed of a first cooling tank and a second cooling tank so as to keep the texture of food best after the reaction of the coagulated whole soybean curd is finished, thus cooling the soybean curd through two stages. After a whole soybean curd is finished, it is stored at a low temperature.

The agitation tank includes a plurality of agitating wings which are driven at a low speed or a high speed by the motor, and the agitation tank is connected to a mineral water pipe and a piped water pipe which are provided to supply mineral water and piped water. A supply pipe is connected to a lower portion of the agitation tank so as to supply soymilk into the inside of the steam pressure pot. An automatic valve opened and closed by a control device is installed at the supply pipe.

A steam rod connected to the boiler to discharge steam downward is installed at the steam pressure pot. The supply pipe configured to supply soymilk into the inside of the deaerator tank is connected to a lower portion of the steam pressure pot. The steam pressure pot allows to heat the inputted soymilk to 100~110° C. with steam and boils and sterilizes the soymilk. Impurities are removed using the filtering mesh from the sterilized soymilk, and the soymilk is moved to the deaerator tank, and the filtered and deaerated soymilk is supplied to the low temperature storing tank.

When the filtered and deaerated soymilk is inputted into the low temperature storing tank, the agitation wings rotate to agitate the heated soymilk while cooling the heated soymilk to the temperature of 6-10° C. and keeping it at the above temperature. After the cooling process is finished, the soymilk which has been cooled and stored at a low temperature is discharged and moves to the packing device. The soymilk is filled into the container for 3-5 times and is packed in the packing device.

However, in the conventional apparatus for manufacturing a soybean curd, the agitator of the agitation tank is provided on top of the agitation tank, whereupon efficient agitation of the soymilk (soybean flour mixture) is hard, and since the boiler is disposed in a closed type, the washing and cleaning in the inside thereof are hard. For this reason, any impurities contained in the boiler may be directly inputted into the soymilk, thus causing a sanitary problem.

In the conventional apparatus for manufacturing a whole soybean curd, the cooling device operates in a water cooling type which uses cooling water or an air cooling type, whereupon the cooling device may be inevitably made larger, and it is hard to accurately control a cooling temperature.

SUMMARY OF THE INVENTION

Accordingly, the present invention is made to resolve the above-mentioned problems. It is an object of the present invention to provide a system for manufacturing a whole soybean curd wherein a steam boiler which produces steam supplied so as to heat a soybean flour mixture stored in the inside of a heating device is configured in an opening and closing type, so it can be opened or closed if necessary to a user, and an inside cleaning is always available, and the system for manufacturing a whole soybean curd includes a heating device and a cooling device.

According to another exemplary embodiment of the present invention, it is another object of the present invention to provide a system for manufacturing a whole soybean curd wherein a first agitator provided at a heating tank and a second agitator provided at a cooling tank are all disposed at a lower portion of the tank, thus obtaining an efficient mixing. The cooling tank includes a heating device and a cooling device which are able to set the flow rate, the cooling temperature, etc. of a heated soybean flour mixture, whereupon the inner temperature, internal pressure of the heating tank can be controlled, and the inner temperature and the internal pressure of the steam boiler and the flow rate of water can be controlled.

It is further another object of the present invention to provide a system for manufacturing a whole soybean curd wherein a thermoelectric cooling element consisting of a Peltier element is provided as a cooling unit so as to cool a soybean flour mixture in the inside of the cooling tank, whereupon a high reliability can be obtained. The system for manufacturing a whole soybean curd includes a heating device and a cooling device which are able to allow an accurate temperature control and an efficient cooling, while providing a semi-permanent cooling unit.

Solution to Problem

To achieve the above object, there is provided a whole soybean curd production system which is formed of a heating device and a cooling device, which may include, but is not limited to, the heating device which includes a heating tank for storing a soybean flour mixture mixed with a soybean flour and water to manufacture a whole soybean curd; a first agitator for agitating the soybean flour mixture stored in the inside of the heating tank; a first agitator driving motor for driving the first agitator; and an opening and closing type boiler which is connected to the heating tank and is configured to store water and includes a lid which can be opened or closed and serves to supply steam into the inside of the heating tank through steam lines; and the cooling device which includes a cooling tank which is connected to the heating tank and is configured to supply a soybean flour mixture heated by the heating device into the inside through an inlet pipe; a second agitator for agitating the soybean flour mixture stored in the inside of the cooling tank; a second agitator driving motor for driving the second agitator; and a cooling unit wherein a cooling surface of a thermoelectric cooling element one surface of which is formed of the cooling surface and the other surface of which is formed of a heat radiation surface is provided on an outer circumferential surface of the cooling tank, thus cooling the soybean flour mixture stored in the cooling tank.

The present invention is characterized in that the heating tank may include, but is not limited to a heating tank pressurizing pump for pressurizing the inside of the heating tank; and a pressure adjusting value which is provided at one side of the heating tank so as to adjust the internal pressure of the heating tank, and the steam line is provided multiple in number and is connected between a lower end portion of the heating tank and the cooling tank.

The present invention is characterized in that the opening and closing type steam boiler may include, but is not limited to an electric heater for heating water stored in the inside; a power unit for supplying power to the electric heater; a water level sensor for measuring the amount of water stored in the inside of the opening and closing type steam boiler; a temperature sensor for measuring the temperature of water stored in the inside of the opening and closing type steam boiler; a pressure sensor for measuring the internal pressure of the opening and closing type steam boiler; a second pressurizing pump for pressurizing the inside of the opening and closing type steam boiler; a pressure adjusting unit disposed at one side of the opening and closing type steam boiler so as to adjust the internal pressure of the opening and closing type steam boiler; and a water supply unit for supplying water into the opening and closing type steam boiler, wherein the lid of the opening and closing steam boiler can be opened or closed by a docking unit which is formed of a body and a cramp.

The present invention is characterized in that there are further provided a steam supply pump disposed at the steam line; and a heating device controller which is configured to control the first pressurizing pump and the pressure adjusting value based on the data measured by the water level sensor, the pressure sensor and the temperature sensor, thus adjusting the internal pressure of the heating tank, and to control the first agitator driving motor and to control the power unit, thus adjusting the temperature of the electric heater, and control the second pressurizing pump and the pressure adjusting unit, thus adjusting the internal pressure of the opening and closing type steam boiler, and control the steam supply pump, thus adjusting the flow rate of the steam which is supplied into the inside of the heating tank.

The present invention is characterized in that the cooling unit may include, but is not limited to, a heat exchanger disposed between the cooling surface of the thermoelectric cooling element and an outer circumferential surface of the cooling tank; and a cooling fan which is disposed on a heat radiation surface of the thermoelectric cooling element.

The present invention is characterized in that the cooling unit may include, but is not limited to, a coolant circulation unit configured to have a predetermined space on an inner surface and an outer surface of the cooling tank for circulating the coolant through the inside; a heat exchanger which is provided on a cooling surface and a heat radiation surface of the thermoelectric cooling element; a coolant supply line which is connected to one side of the heat exchanger provided on the cooling surface and to the coolant circulation unit so as to supply the coolant to the coolant circulation unit; a coolant inlet line which is connected to the coolant circulation unit and to the other side of the heat exchanger provided on the cooling surface and is configured to input the coolant to the heat exchanger which is provided on the cooling surface; and a circulation pump for providing a driving force to circular the coolant, wherein in the heat exchanger disposed at the side of the cooling surface, the cooling surface allows to absorb the heat of the coolant, thus cooling the coolant, and the cooled coolant is supplied to the coolant circulation unit, thus cooling the soybean flour mixture stored in the inside of the cooling tank.

The present invention is characterized in that there are further provided a soybean flour mixture supply pump disposed at the inlet pipe; and a cooling device controller which is configured to control the second agitator driving motor and control the circulation pump, thus adjusting the flow rate of the coolant which is supplied to the coolant circulation unit, and control the thermoelectric cooling element, thus setting the temperatures of the cooling surface and the heat radiation surface, and control the driving of the cooling fan and control the soybean flour mixture supply pump, thus adjusting the flow rate of the soybean flour mixture supplied to the cooling tank.

To achieve the above objects according to another aspect of the present invention, the method for manufacturing a whole soybean curd using a whole soybean curd manufacturing system of the present invention may include, but is not limited to, a step wherein a soybean flour mixture mixed with a soybean flour and water are inputted into the heating tank, the first agitator is driven by the first agitator driving motor, thus agitating the soybean flour mixture, and at the same time, the steam produced by the opening and closing type steam boiler is supplied into the inside of the heating tank through the steam line, thus heating the soybean flour mixture; a step wherein when the soybean flour mixture reaches the set temperature, the soybean flour mixture heated through the inlet pipe is supplied into the inside of the cooling tank; a step wherein the second agitator is driven by the second agitator driving motor, thus agitating the soybean flour mixture in the inside of the cooling tank, and the cooling surface of the thermoelectric cooling element consisting of the cooling surface and the heat radiation surface is provided on an outer surface of the cooling tank, thus cooling the soybean flour mixture in the cooling tank with the aid of the cooling surface.

Advantageous Effects

According to the exemplary embodiments of the present invention, a steam boiler is configured in an opening and closing type, which produces steam so as to heat a soybean flour mixture stored in the inside of a heating device, whereupon the system can be opened or closed if necessary to a user, thus performing an inside washing any time.

In addition, according to the exemplary embodiments of the present invention, the first agitator provided at the heating tank and the second agitator provided at the cooling tank are all provided at a lower portion of the tank, thus obtaining efficient mixing, and the inner temperature and the internal pressure of the heating tank can be controlled. The inner temperature and the internal pressure of the steam boiler and the flow rate of water can be controlled. The flow rate of the heated soybean flour mixture, the cooling temperature, etc. can be set in the cooling tank.

In addition, a thermoelectric cooling element consisting of a Peltier element is provided as a cooling unit so as to cool a soybean flour mixture in the inside of the cooling tank, whereupon a high reliability can be obtained, while providing a semi-permanent cooling unit, and an accurate temperature control is available, and an efficient cooling is possible.

LEGEND OF REFERENCE NUMBERS

Figure 1:
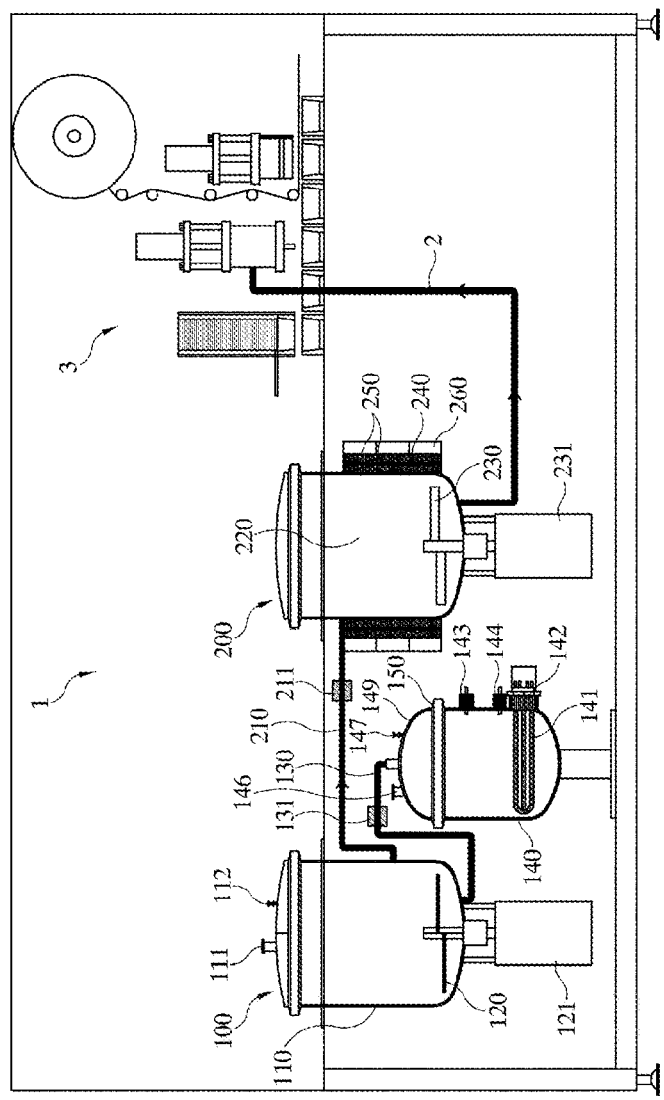
FIG. 1 is a view illustrating a configuration of a system for manufacturing a whole soybean curd which consists of a heating device and a cooling device according to a first exemplary embodiment of the present invention.

1: whole soybean curd manufacturing system 2: whole soybean curd discharge pipe 3: packing device
100: heating device 110: heating tank 111: first pressurizing pump
112: pressure adjusting valve 113: first pressure sensor 114: first temperature sensor
120: first agitator 121: first agitator driving motor
130: steam line 131: steam supply pump
140: opening and closing type steam boiler 141: electric heater
142: power unit 143: water level sensor 144: second pressure sensor
145: second temperature sensor 146: second pressurizing pump
147: pressure adjusting unit
148: water supply unit 149: lid 150: cramp
200: cooling device 210: inlet pipe 211: soybean flour mixture supply pump
220: cooling tank 230: second agitator 231: second agitator driving motor
240: thermoelectric cooling element 241: cooling surface 242: heat radiation surface
250: heat exchanger 260: cooling fan 271: coolant supply line
272: coolant inlet line 273: coolant circulation unit 274: circulation pump

DESCRIPTION OF SPECIFIC EMBODIMENTS OF THE INVENTION

Figure 2:
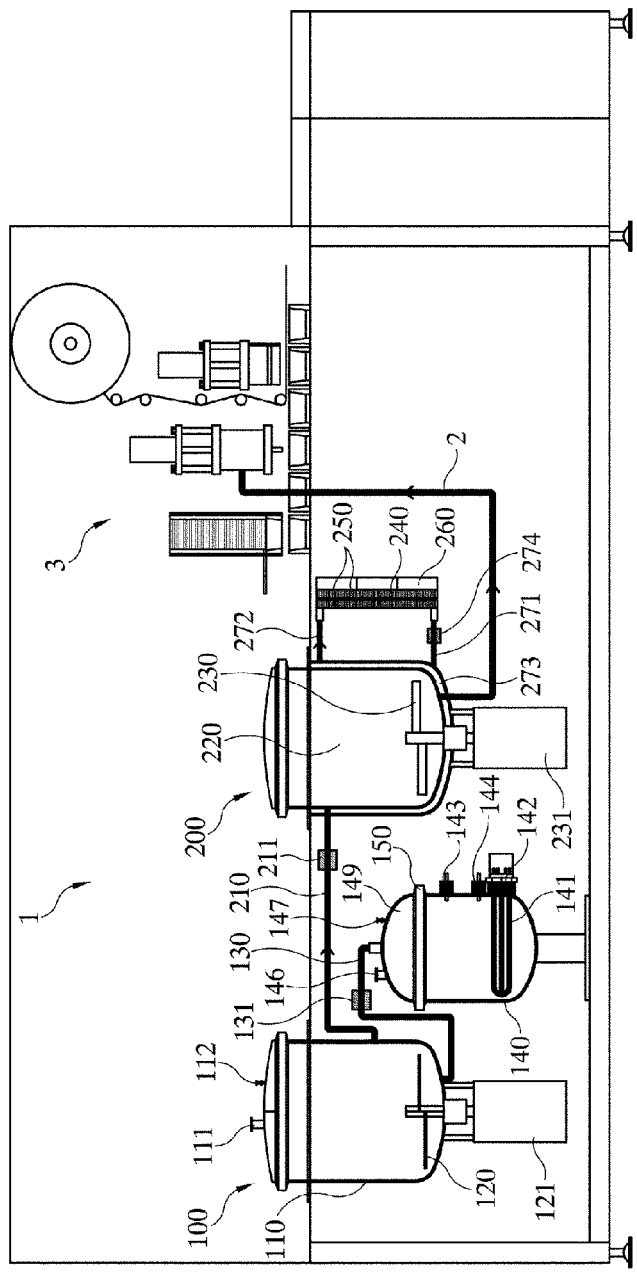
FIG. 2 is a view illustrating a configuration of a system for manufacturing a whole soybean curd which consists of a heating device and a cooling device according to a second exemplary embodiment of the present invention.
Figure 3:
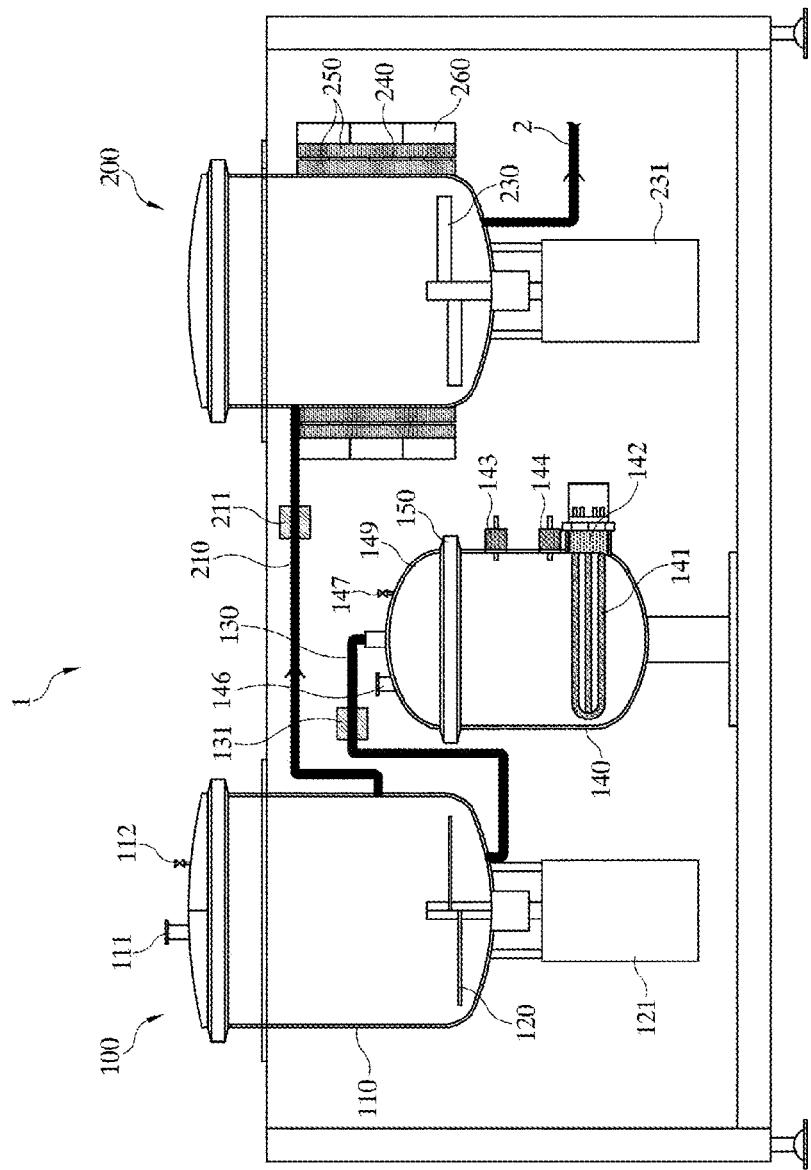
FIG. 3 is a view illustrating a configuration of a heating device and a cooling device of a system for manufacturing a whole soybean curd according to a first exemplary embodiment of the present invention.
Figure 4:
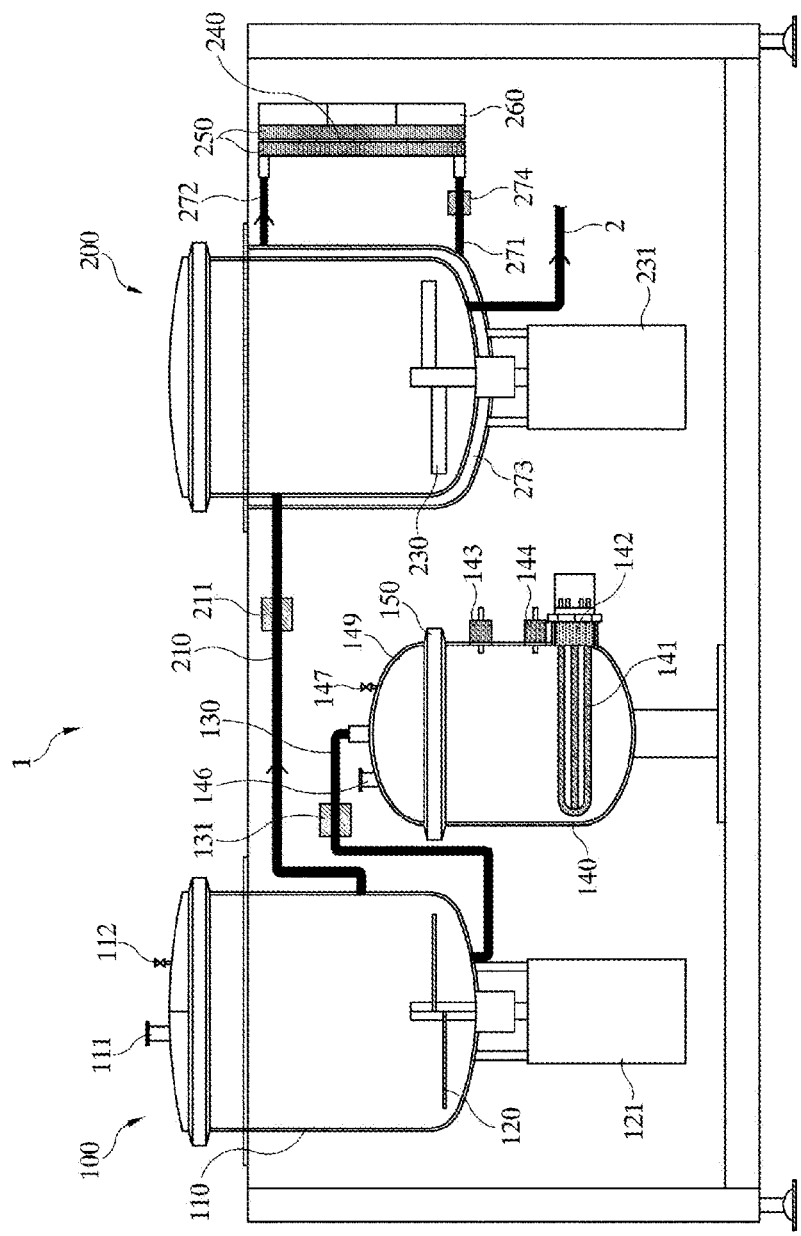
FIG. 4 is a view illustrating a configuration of a heating device and a cooling device of a system for manufacturing a whole soybean curd according to a second exemplary embodiment of the present invention.

The configuration and operation of the whole soybean curd manufacturing system 1 consisting of a heating device 100 and a cooling device 200 according to an exemplary embodiment of the present invention will be described below. First, FIG. 1 is a view illustrating a configuration of a whole soybean curd manufacturing system 1 which consists of a heating device 100 and a cooling device 200 according to a first exemplary embodiment of the present invention. FIG. 2 is a view illustrating a configuration of a whole soybean curd manufacturing system 1 which consists of a heating device 100 and a cooling device 200 according to a second exemplary embodiment of the present invention. FIG. 3 is a view illustrating a configuration of a heating device 100 and a cooling device 200 of a whole soybean curd manufacturing system 1 according to a first exemplary embodiment of the present invention. FIG. 4 is a view illustrating a configuration of a heating device 100 and a cooling device 200 of a whole soybean curd manufacturing system 1 according to a second exemplary embodiment of the present invention.

Referring to FIGS. 1 and 2, the whole soybean curd manufacturing systems 1 each consisting of a heating device 100 and a cooling device 200 according to the first and second exemplary embodiments of the present invention are configured same in their heating devices 100 and other components except for a detailed configuration of the cooling unit provided in the cooling tank 200.

Referring to FIGS. 1, 2, 3 and 4, the whole soybean curd manufacturing system 1 consisting of a heating device 100 and a cooling device 200 according to an exemplary embodiments of the present invention may include, but is not limited to, a heating device 100 which is formed of a heating tank 110 for storing a soybean flour mixture mixed with a soybean flour and water so as to manufacture a whole soybean curd, a first agitator 120 for agitating the soybean flour mixture stored in the heating tank 110, a first agitator driving motor 121 for driving the first agitator 120, and an opening and closing configuration which is connected to the heating tank 110 and is configured to store water inside and is formed of a lid 149 which can be opened and closed, thus supplying steam into the inside of the heating tank 110; and a cooling device 200 which is formed of a cooling tank 220 connected to the heating tank 110 for supplying the soybean flour mixture heated by the heating device 100 into the inside through the inlet pipe 210, a second agitator 230 for agitating the soybean flour mixture stored in the cooling tank 220, a second agitator driving motor 231 for driving the second agitator 230, and a cooling unit for cooling the soybean flour mixture stored in the cooling tank 220, wherein a cooling surface 241 of the thermoelectric cooling element 240 is formed on an outer circumferential surface of the cooling tank 220 wherein one surface of the thermoelectric cooling element 240 is formed of the cooling surface 241, and the other surface thereof is formed of a heat radiation surface 242.

MODES FOR CARRYING OUT THE INVENTION

Figure 5:
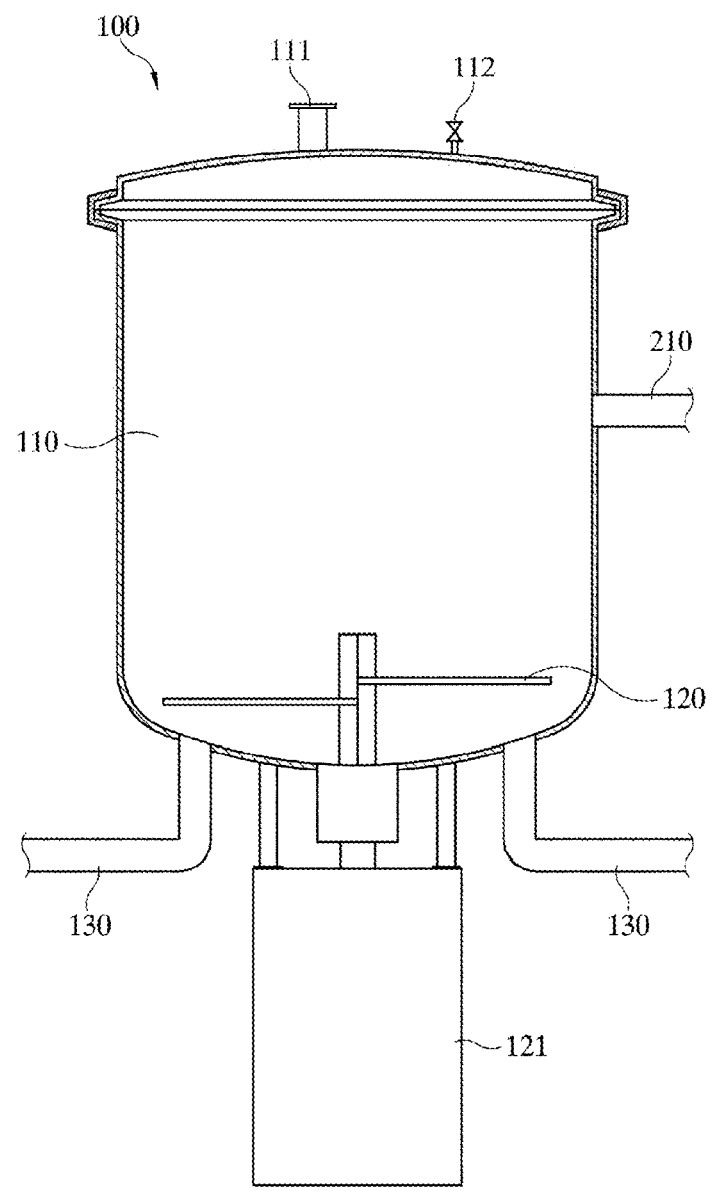
FIG. 5 is a cross sectional view illustrating a heating tank according to an exemplary embodiment of the present invention.
Figure 6:
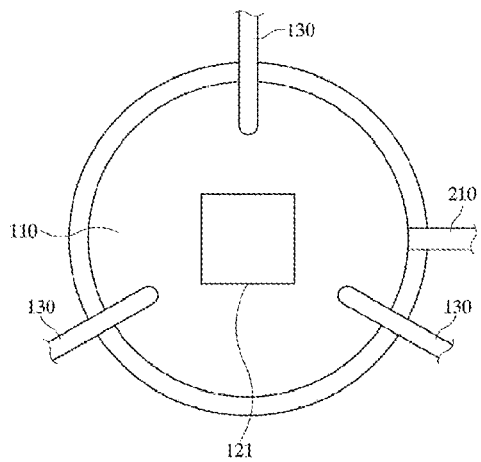
FIG. 6 is a bottom view illustrating a heating tank according to an exemplary embodiment of the present invention.

The configuration and function of the heating device 100 which is a component of the whole soybean manufacturing system 1 consisting of the heating device 100 and the cooling device 200 according to an exemplary embodiment of the present invention will be described below in detail. First, FIG. 5 is a cross sectional view illustrating a heating tank 110 according to an exemplary embodiment of the present invention. FIG. 6 is a bottom view illustrating a heating tank 110 according to an exemplary embodiment of the present invention.

Referring to FIGS. 5 and 6, a soybean flour mixture mixed with a soybean flour and water is stored in the inside of the heating tank 110 according to an exemplary embodiment of the present invention. According to a more specific embodiment, it is preferred that a soybean flour and water are mixed at a volume ratio of 5:1.

Referring to FIGS. 5 and 6, the heating device 100 according to an exemplary embodiment of the present invention may include a first agitator 120 at a lower end in the inside of the heating tank 110. The first agitator 120 is formed of a rotary shaft and a plurality of blades and are driven and rotate by the first agitator driving motor 121, whereupon the soybean flour mixture stored in the inside of the heating tank 110 can be agitated by the first agitator 120. More specifically, it is preferred that the first agitator driving motor 121 allows to rotate the first agitator 120 at about 3700 rpm.

Referring to FIGS. 5 and 6, the heating device 100 according to an exemplary embodiment of the present invention may include a steam line 130 connected between the lower end of the heating tank 110 and the opening and closing type steam boiler 140. Referring to FIG. 6, in more specific embodiment, three steam lines 130 are provided at a lower side of the heating tank 110, and it is preferred that the three steam lines 130 are arranged spaced apart at an interval of about 120°. With the aid of the position and configuration of the steam lines 130, the steam of above 100° C. produced by the opening and closing type steam boiler 140 can be supplied into the inside of the heating tank 110, thus more efficiently heating the soybean flour mixture.

In addition, the heating device 100 according to an exemplary embodiment of the present invention may further include a first pressurizing pump 111 disposed on an upper surface of the heating tank 110 to pressurize the inside of the heating tank 110. The pressure in the inside of the heating tank 110 can increase by the first pressurizing tank 111, thus increasing the boiling point of the soybean flour mixture in the heating tank 110. In addition, the heating device 100 according to an exemplary embodiment of the present invention may further include a pressure adjusting valve 112 disposed on an upper surface of the heating tank 110 so as to adjust the pressure in the inside of the heating tank 110.

Figure 7:
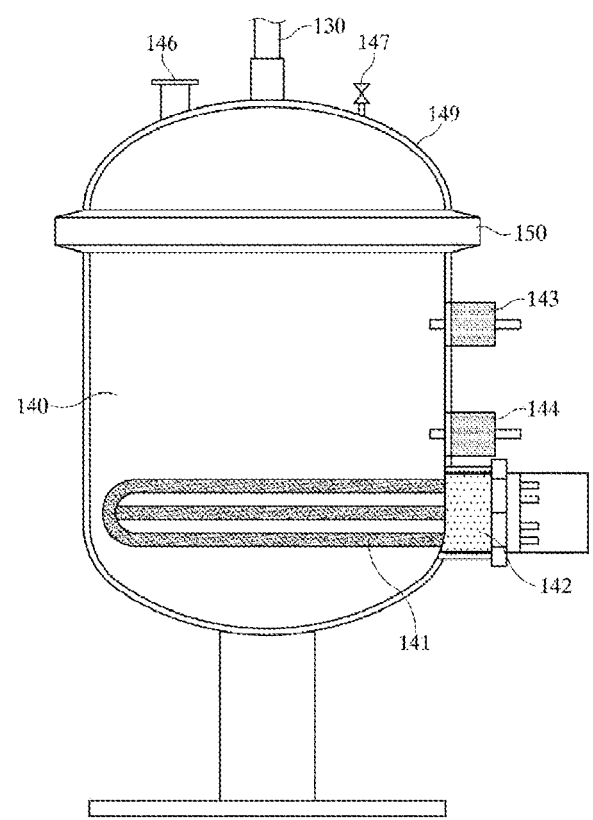
FIG. 7 is a side view illustrating an opening and closing type steam boiler according to an exemplary embodiment of the present invention.
Figure 8:
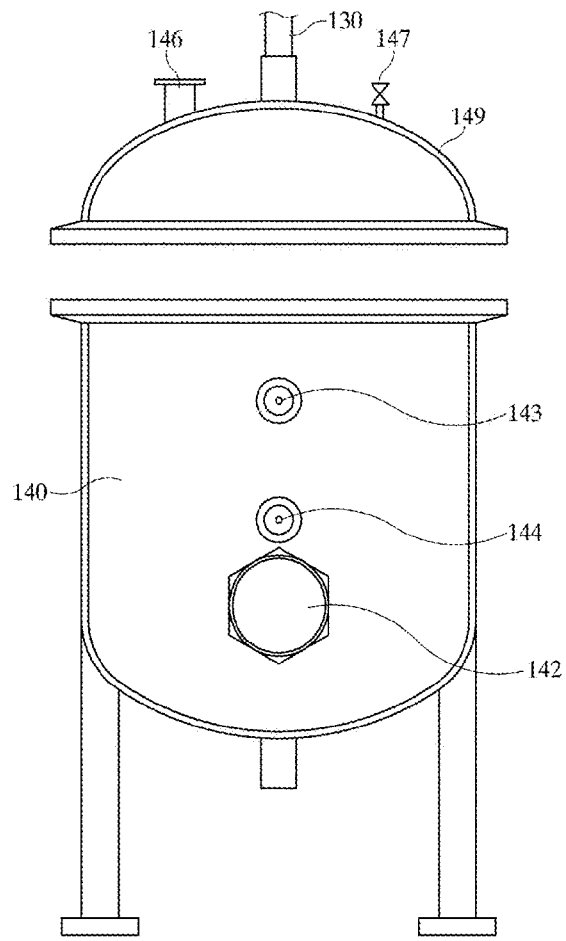
FIG. 8 is a front view illustrating an opening and closing type steam boiler with a lid open according to an exemplary embodiment of the present invention.
Figure 9:
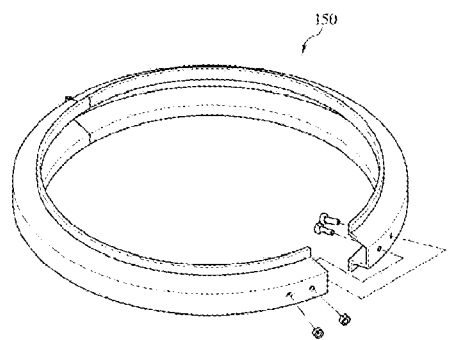
FIG. 9 is a perspective view illustrating a cramp according to an exemplary embodiment of the present invention.

The configuration and function of the opening and closing type steam boiler 140 connected to the heating tank 110 will be described below in detail. First, FIG. 7 is a side view illustrating an opening and closing type steam boiler 140 according to an exemplary embodiment of the present invention. FIG. 8 is a front view illustrating an opening and closing type steam boiler 140 with a lid 149 open according to an exemplary embodiment of the present invention. FIG. 9 is a perspective view illustrating a cramp 150 according to an exemplary embodiment of the present invention.

Referring to FIGS. 7 and 8, the opening and closing type steam boiler 140 according to an exemplary embodiment of the present invention may include a lid 149 at an upper side and can be opened or closed if necessary for a user. In the present invention directed to the manufacturing of soybean curd, a sanitary issue is very important since steam is directly supplied to the soybean flour mixture stored in the inside of the heating tank 110. To this end, the steam boiler 140 according to an exemplary embodiment of the present invention is manufactured in an opening and closing type. If necessary for a user, the lid 149 can be opened any time so as to clean or wash the inside of the boiler.

The opening and closing type steam boiler 140 according to an exemplary embodiment of the present invention may include a docking unit for engaging the lid 149 and the body. In the specific embodiment, the docking unit may be formed of a cramp 150 as in FIG. 9.

The opening and closing type steam boiler 140 according to an exemplary embodiment of the present invention may include, but is not limited to, an electric heater 141 for heating water stored in the inside; a power unit 142 for supplying power to the electric heater 141; and a water supply unit 148 for supplying water into the inside of the opening and closing type steam boiler 140.

Referring to FIGS. 7 and 8, the opening and closing type steam boiler 140 according to an exemplary embodiment of the present invention may include, but is not limited to, a second pressure sensor 144 for measuring the pressure in the inside of the steam boiler 140; a second temperature sensor 145 for measuring the inside temperature in real time; and a water level sensor 143 for measuring the level of water of the water which has been supplied to the inside of the opening and closing type steam boiler 140.

At one side of the lid 149 of the opening and closing type steam boiler 140 according to an exemplary embodiment of the present invention, there may be a second pressurizing pump 146 for pressurizing the inside of the opening and closing type steam boiler 140; and a pressure adjusting unit 147 for adjusting the inside pressure of the opening and closing type steam boiler 140. In addition, at one side of the steam line 130 connected between the opening and closing type steam boiler 140 and the heating tank 110, there is a steam supply pump 131 for driving a driving force to the inside of the heating tank 110.

The method for controlling the heating device 100 with the aid of a heating device controller which is configured to control the whole components of the heating device 100 according to an exemplary embodiment of the present invention will be described. First, FIG. 10 is a block diagram illustrating a signal flow by a heating device controller according to an exemplary embodiment of the present invention.

Figure 10:
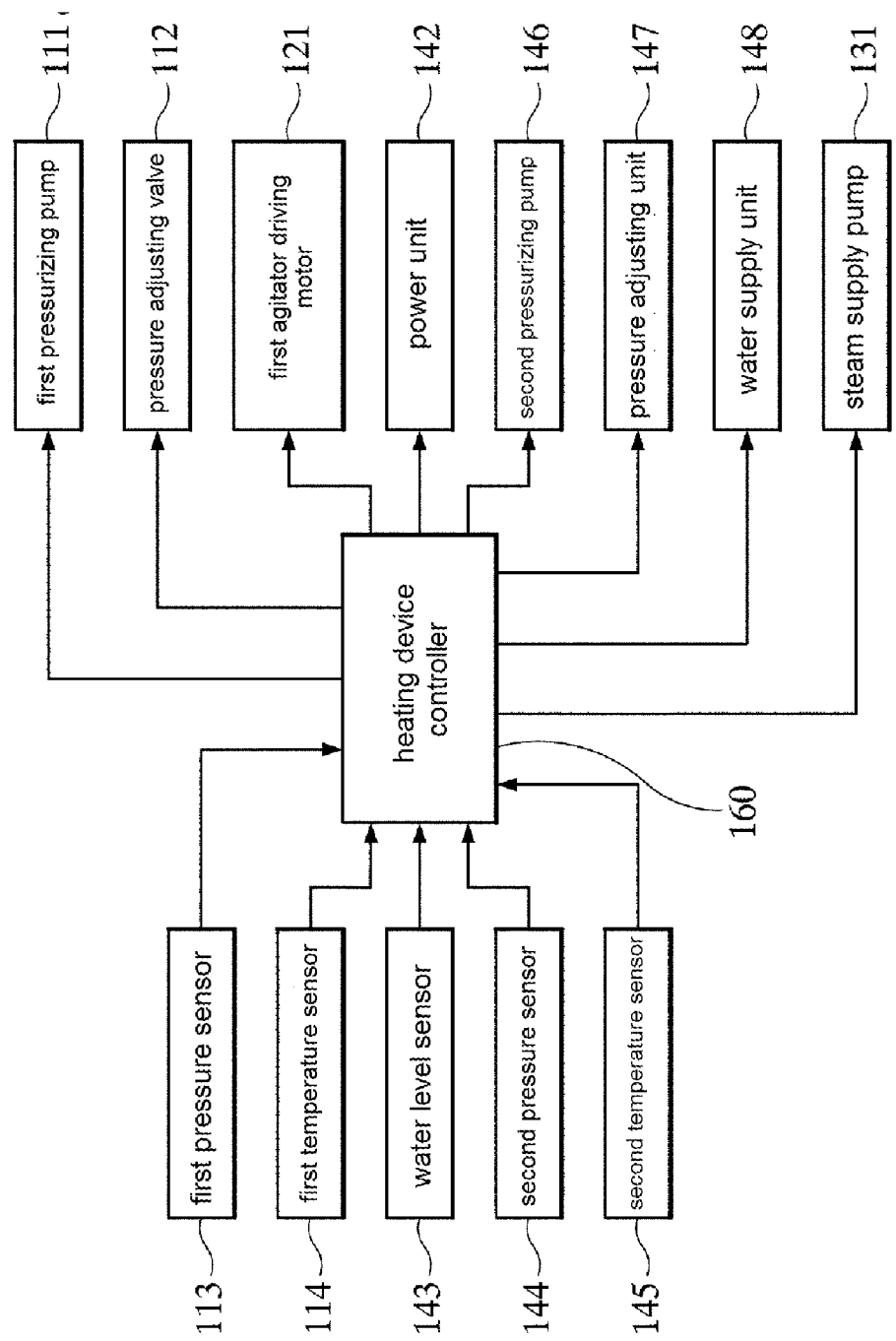
FIG. 10 is a block diagram illustrating a signal flow by a heating device controller according to an exemplary embodiment of the present invention.

Referring to FIG. 10, the heating device controller is configured to receive in real time the data measured by the first pressure sensor 113 and the first temperature sensor 114 which are disposed at the heating tank 110. Based on such data, the heating device controller controls the first pressurizing pump 111 and the pressure adjusting value 112 which are provided at the heating tank 110, thus adjusting the pressure in the inside of the heating tank 110. In addition, the heating device controller allows to control the first agitator driving motor 121 which drives the first agitator 120 disposed at the heating tank 110, thus adjusting the rotation speed of the first agitator 120.

Referring to FIG. 10, the heating device controller is configured to receive in real time the data measured by the water level sensor 143, the second pressure sensor 144 and the second temperature sensor 145 which are provided at the opening and closing type steam boiler 140. Based on such data, the heating device controller controls the power unit 142, thus adjusting the temperature of the electric heater 141 provided at the opening and closing type steam boiler 140. The pressure in the inside of the opening and closing type steam boiler 140 can be adjusted by controlling the second pressurizing pump 146 and the pressure adjusting unit 147. In addition, the heating device controller can adjust the flow of water which is supplied to the opening and closing type steam boiler 140 by controlling the water supply unit 148. The flow of steam supplied into the inside of the heating tank 110 can be adjusted by controlling the steam supply pump 131.

Figure 11:
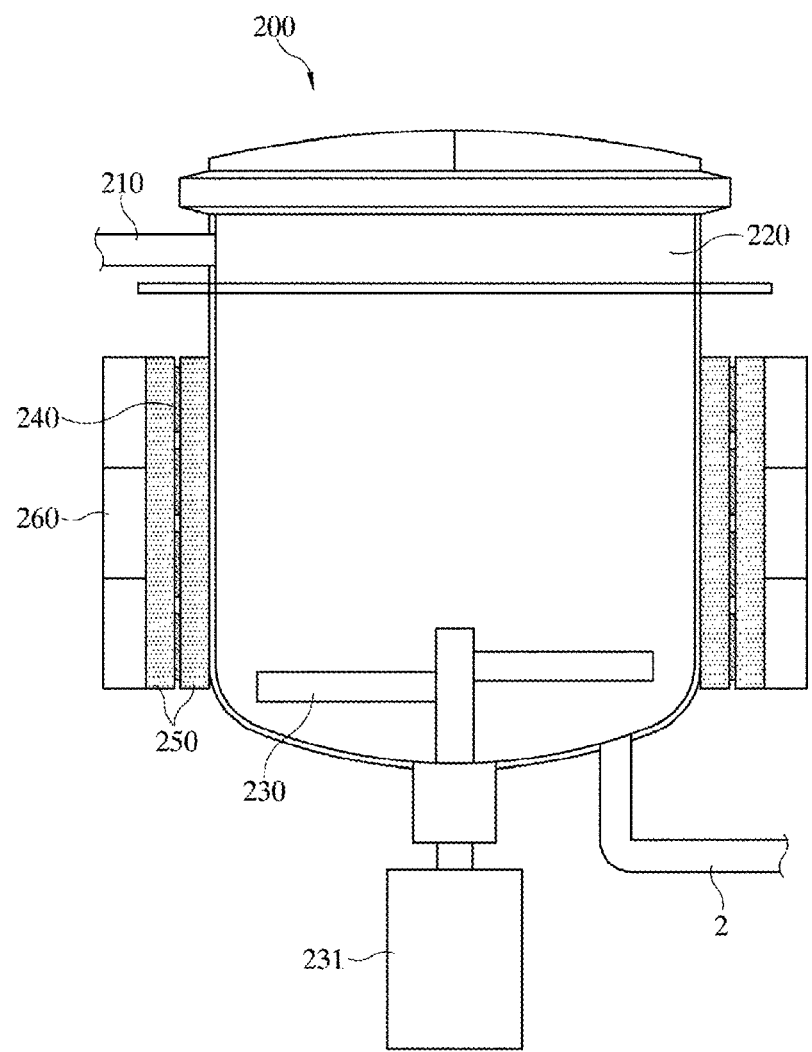
FIG. 11 is a cross sectional view illustrating a cooling device according to a first exemplary embodiment of the present invention.
Figure 12:
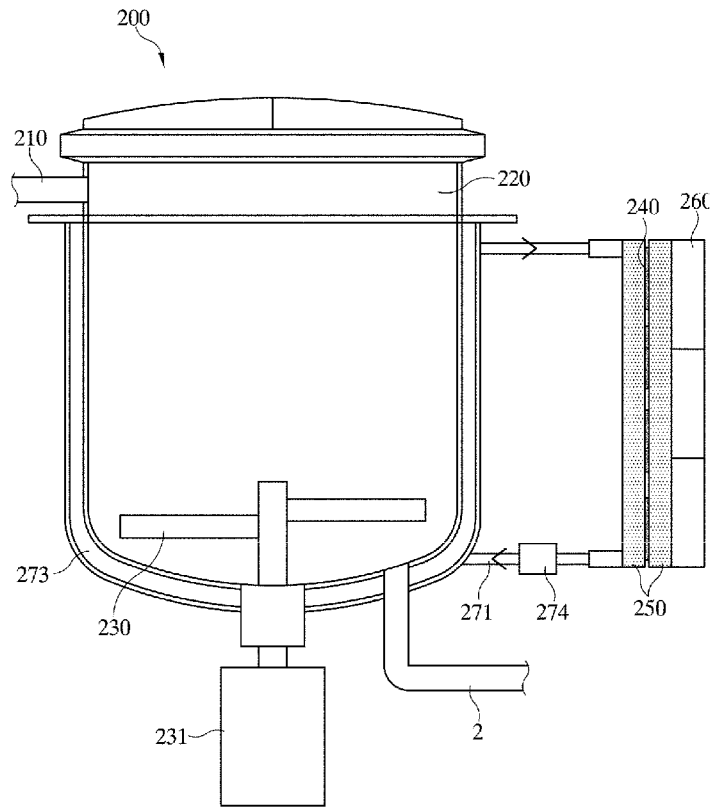
FIG. 12 is a cross sectional view illustrating a cooling device according to a second exemplary embodiment of the present invention.

The configuration and function of the cooling device 200 according to the first and second exemplary embodiments of the present invention will be described below. First, FIG. 11 is a cross sectional view illustrating a cooling device 200 according to a first exemplary embodiment of the present invention. FIG. 12 is a cross sectional view illustrating a cooling device 200 according to a second exemplary embodiment of the present invention.

The cooling device 200 according to a first exemplary embodiment of the present invention may include, but is not limited to, a cooling tank 220 wherein the heated soybean flour mixture is supplied into the inside through the inlet pipe 210; a second agitator 230 for agitating the soybean flour mixture stored in the cooling tank 220; a second agitator driving motor 231 for driving the second agitator 230; and a cooling unit wherein the cooling surface 241 of the thermoelectric cooling element 240 one surface of which is formed of the cooling surface 241, and the other surface of which is formed of a heat radiation surface 242 is arranged on an outer circumferential surface of the cooling tank 220, thus cooling the soybean flour mixture stored in the cooling tank 220.

Referring to FIG. 11, the cooling device 200 according to a first exemplary embodiment of the present invention is configured in such a way that a plurality of thermoelectric cooling elements 240 each formed of a Peltier element are provided on an outer circumferential surface of the cooling tank 220. The Peltier element can provide a Peltier effect. For this, one surface thereof is formed of a cooling surface 241, and the other surface thereof is formed of a heat radiation surface 242. The temperature difference between the two surfaces is about 30~50° C. If the temperature of the cooling surface 241 is set at −15° C., the temperature of the heat radiation surface 242 may be about 15~35° C.

The above Peltier effect means an effect wherein if a direct current voltage is supplied to two different ends of an element, one surface allows to absorb heat based on the direction of the current, and the opposite surface allows to radiate heat. For example, the ice cooler is manufactured using the above cooling effect of the Peltier element. The performance is so strong to quickly form dew on the cooling surface 241 (heat absorption surface). The element which uses the above Peltier effect is called a thermoelectric cooling element 240 or a thermoelectric module (TEM).

As for the basic principle of the Peltier element, energy is necessary for electrons to move between two metals. Such necessary energy can be obtained from the energy that the metals have. Here, the formula corresponding to the Seebeck effect may directly apply to the amount of the current which applies to the element and calories due to heat absorption and heat radiation, and a proportional factor is same. The Seebeck effect means that freedom electrons get energy with the aid of supplied heat, and electromotive force can be produced using such energy.

Figure 13:
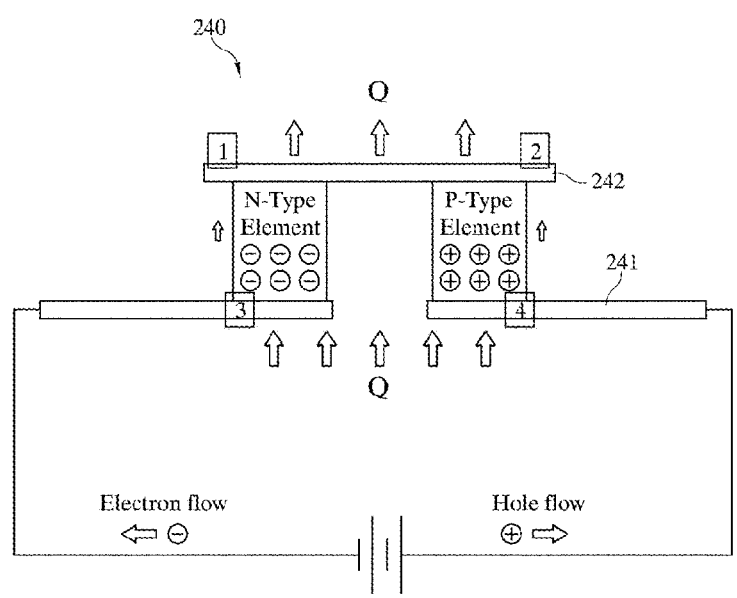
FIG. 13 is a schematic view illustrating a configuration of a thermoelectric cooling element according to an exemplary embodiment of the present invention.

FIG. 13 is a schematic view illustrating a configuration of a thermoelectric cooling element 240 according to an exemplary embodiment of the present invention. Referring to FIG. 13, current flows in the counterclockwise direction, and a positive hole is formed at the contact point of the number 4 in the P-type semiconductor and moves toward the contact point of the number 2. Here, the positive hole plays a role of carrying heat, and consequently, the 3-4 plate continuously gets colder, and the 1-2 plate continuously gets heated. If the flowing direction of current changes, the flows of the electron and positive holes change, and the surfaces for radiating and absorbing the heat can be reversely changed.

If power applies to a junction of each of both sides of the system 1 wherein only the both ends of two different metals are bonded, and one junction absorbs heat, and the other junction radiates heat. The thermoelectric cooling element 240 may be formed of two or more semiconductor couples which are electrically serial and are thermally parallel. Such an arrangement is provided for the heat to flow in only one direction through the thermoelectric cooling element 240 while electric power alternately flows over the upper and lower sides of the substrate through the N-type and P-type elements.

Since the thermoelectric cooling element 240 consisting of a Peltier element has a rigid structure, it has a high reliability and can be used semi-permanently. With the same thermoelectric cooling element 240, two functions of heating and cooling can be simultaneously provided. If an appropriate control system is available, an accurate temperature control can be advantageously obtained.

In addition, referring to FIG. 11, the cooling device 200 according to a first exemplary embodiment of the present invention may equip with a cooling fan 260 at the side of the heat radiation surface 242 of the thermoelectric cooling element 240. A heat exchanger 250 may be provided between the heat radiation surface 242 and the cooling fan 260 and between the cooling surface 241 and an outer surface of the cooling tank 220.

Referring to FIG. 12, different from the first exemplary embodiment, an indirect cooling method may apply to the cooling device 200 according to a second exemplary embodiment of the present invention. The cooling unit provided at the cooling device 200 according to a second exemplary embodiment of the present invention may include, but is not limited to, a coolant circulation unit 273 which has a predetermined space on an outer circumferential surface of the cooling tank 220 to circulate coolant inside; a heat exchanger 250 provided on the cooling surface 241 and the heat radiation surface 242 of the thermoelectric cooling element 240; a coolant supply line 271 connected to one side of the heat exchanger 250 provided on the cooling surface 241 and to the coolant circulation unit 273 to supply the coolant to the coolant circulation unit 273; a coolant inlet line 272 connected to the coolant circulation unit 273 and to the other side of the heat exchanger 250 provided on the cooling surface 241 so as to input the coolant from the coolant circulation unit 273 to the side of the heat exchanger 250 provided on the cooling surface 241; and a circulation pump 274 which provides a driving force for circulating the coolant.

In the heat exchanger 250 provided at the side of the cooling surface 241, the cooling surface 241 absorbs the heat of the coolant, thus cooling the coolant. The cooled coolant is supplied to the coolant circulation unit 273, thus cooling the soybean flour mixture stored in the cooling tank 220.

In addition, the whole soybean curd manufacturing system 1 according to an exemplary embodiment of the present invention may include a soybean flour mixture supply pump 211 which is disposed at one side of the inlet pipe 210 for inputting the heated soybean flour mixture into the cooling tank 220 connected between the cooling tank 220 and the heating tank 110.

Figure 14:
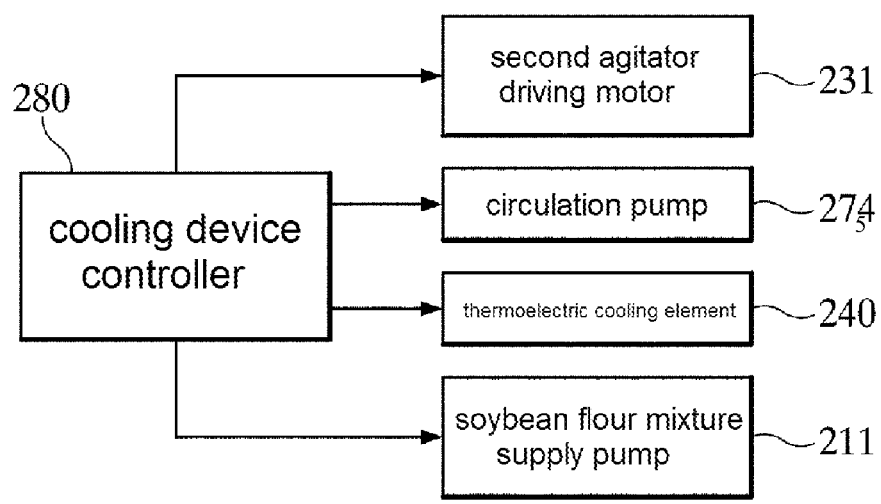
FIG. 14 is a block diagram illustrating a signal flow by a cooling device controller according to the first and second exemplary embodiments of the present invention.

The method for controlling the cooling device 200 with the aid of the cooling device controller which controls the whole components of the above-mentioned cooling device 200 will be described. FIG. 14 is a block diagram illustrating a signal flow by a cooling device controller according to the first and second exemplary embodiments of the present invention.

Referring to FIG. 14, the cooling device controller controls the second agitator driving motor 231, thus adjusting the rotation speed of the second agitator 230, and controls the circulation pump 274, thus adjusting the flow rate of the coolant supplied to the coolant circulation unit 273.

The cooling device controller controls the thermoelectric cooling element 240, thus setting the temperatures of the cooling surface 241 and the heat radiation surface 242, and controls the driving of the cooling fan 260, and controls the soybean flour mixture supply pump 211, thus adjusting the flow rate of the soybean flour mixture which is supplied to the cooling device 220.

The soybean curd which has been manufactured through an additional cooling is inputted into the packing device 3 through the whole soybean curd discharge pipe 2, and the whole soybean curd inputted in the packing device 3 is automatically packed by the packing device 3.

Figure 15:
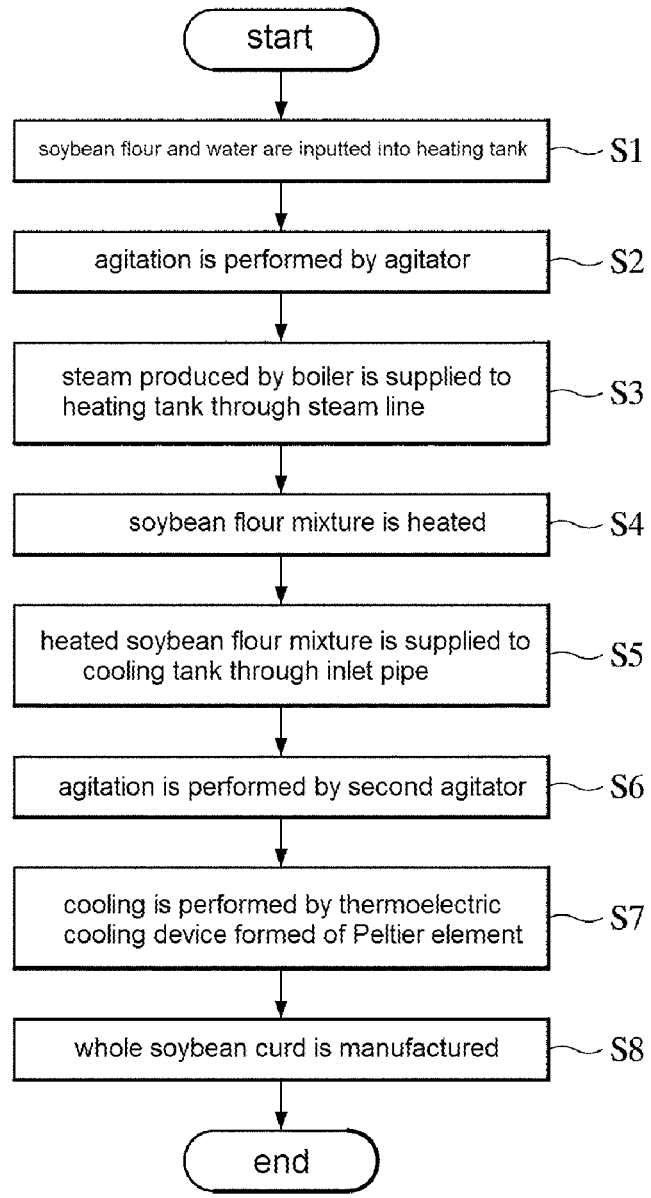
FIG. 15 is a flow chart for describing a method for manufacturing a whole soybean curd using a system for manufacturing a whole soybean curd which consists of a heating device and a cooling device according to an exemplary embodiment of the present invention.

The method for manufacturing a whole soybean curd using the above described whole soybean curd manufacturing system 1 will be briefly described below. FIG. 15 is a flow chart for describing a method for manufacturing a whole soybean curd using a whole soybean curd manufacturing system 1 which consists of a heating device 100 and a cooling device 200 according to an exemplary embodiment of the present invention.

First, the soybean flour mixture mixed with a soybean flour and water is inputted in the heating tank 110 (S1). The first agitator driving motor 121 operates, and the soybean flour mixture inputted in the heating tank 110 through the first agitator 120 is agitated (S2). At the same time, the steam produced in the opening and closing type steam boiler 140 is supplied into the heating tank 110 through the steam line 130, thus heating the soybean flour mixture (S4).

In addition, when the soybean flour mixture reaches the set temperature, the soybean flour mixture heated through the inlet pipe 210 is supplied into the cooling tank 220 (S5).

Next, the second agitator 230 is driven by the second agitator driving motor 231, and the soybean flour mixture in the cooling tank 220 is agitated (S6). At the same time, the temperature of an outer surface of the cooling tank decreases by the cooling surface 241 of the thermoelectric cooling element 240 consisting of the cooling surface 241 and the heat radiation surface 242, whereupon the soybean flour mixture in the cooling tank 220 is cooled by the cooling surface 241 (S7), thus manufacturing a whole soybean curd.

What is claimed is:

1. A whole soybean curd production system which is formed of a heating device and a cooling device, comprising:
the heating device which includes:
   a heating tank for storing a soybean flour mixture mixed with a soybean flour and water to manufacture a whole soybean curd;
   a first agitator for agitating the soybean flour mixture stored in an inside of the heating tank;
   a first agitator driving motor for driving the first agitator; and
   an opening and closing type boiler which is connected to the heating tank and is configured to store water and includes a lid which can be opened or closed and serves to supply steam into the inside of the heating tank through steam lines; and
the cooling device which includes:
   a cooling tank which is connected to the heating tank and is configured to supply a soybean flour mixture heated by the heating device into the inside through an inlet pipe;
   a second agitator for agitating the soybean flour mixture stored in the inside of the cooling tank;
   a second agitator driving motor for driving the second agitator; and
   a cooling unit wherein a cooling surface of a thermoelectric cooling element one surface of which is formed of the cooling surface and another surface of which is formed of a heat radiation surface is provided on an outer circumferential surface of the cooling tank, thus cooling the soybean flour mixture stored in the cooling tank
wherein the heating tank comprises:
   a first pressurizing pump for pressurizing the inside of the heating tank; and
   a pressure adjusting value which is provided at one side of the heating tank so as to adjust an internal pressure of the heating tank, and
   the steam line is provided multiple in number and is connected between a lower end portion of the heating tank and the cooling tank.

2. The system of claim 1, wherein the opening and closing type steam boiler comprises:
   an electric heater for heating water stored in the inside;
   a power unit for supplying power to the electric heater;
   a water level sensor for measuring the amount of water stored in an inside of the opening and closing type steam boiler;
   a temperature sensor for measuring a temperature of water stored in the inside of the opening and closing type steam boiler;
   a pressure sensor for measuring an internal pressure of the opening and closing type steam boiler;
   a second pressurizing pump for pressurizing the inside of the opening and closing type steam boiler;
   a pressure adjusting unit disposed at one side of the opening and closing type steam boiler so as to adjust the internal pressure of the opening and closing type steam boiler; and
   a water supply means for supplying water into the opening and closing type steam boiler, wherein the lid of the opening and closing steam boiler can be opened or closed by a docking means which is formed of a body and a cramp.

3. The system of claim 2, further comprising:
   a steam supply pump disposed at the steam line; and
   a heating device controller which is configured to control the first pressurizing pump and the pressure adjusting value based on data measured by the water level sensor, the pressure sensor and the temperature sensor, thus adjusting the internal pressure of the heating tank, and to control the first agitator driving motor and to control the power unit, thus adjusting a temperature of the electric heater, and to control the second pressurizing pump and the pressure adjusting unit, thus adjusting the internal pressure of the opening and closing type steam boiler, and to control the steam supply pump, thus adjusting a flow rate of the steam which is supplied into the inside of the heating tank.

4. The system of claim 1, wherein the cooling means comprises:
   a heat exchanger disposed between the cooling surface of the thermoelectric cooling element and an outer circumferential surface of the cooling tank; and
   a cooling fan which is disposed on a heat radiation surface of the thermoelectric cooling element.

5. The system of claim 4, wherein the cooling means comprises:
   a coolant circulation unit configured to have a predetermined space on an inner surface and an outer surface of the cooling tank for circulating the coolant through an inside;
   a heat exchanger which is provided on a cooling surface and a heat radiation surface of the thermoelectric cooling element;
   a coolant supply line which is connected to one side of the heat exchanger provided on the cooling surface and to the coolant circulation unit so as to supply the coolant to the coolant circulation unit;
   a coolant inlet line which is connected to the coolant circulation unit and to the other side of the heat exchanger and is configured to input the coolant to the heat exchanger which is provided on the cooling surface; and a circulation pump for providing a driving force to circular the coolant, wherein in the heat exchanger disposed at the side of the cooling surface, the cooling surface allows to absorb the heat of the coolant, thus cooling the coolant, and the cooled coolant is supplied to the coolant circulation unit, thus cooling the soybean flour mixture stored in the inside of the cooling tank.

6. The system of claim 5, further comprising:

a soybean flour mixture supply pump disposed at the inlet pipe; and a cooling device controller which is configured to control the second agitator driving motor and control the circulation pump, thus adjusting a flow rate of the coolant which is supplied to the coolant circulation unit, and control the thermoelectric cooling element, thus setting temperatures of the cooling surface and the heat radiation surface, and control the driving of the cooling fan and control the soybean flour mixture supply pump, thus adjusting a flow rate of the soybean flour mixture.

\* \* \* \* \*